United States Patent [19]

Cornet et al.

[11] Patent Number: 4,712,362
[45] Date of Patent: Dec. 15, 1987

[54] HARVESTER FOR EXPERIMENTAL PLOTS OF GROUND

[75] Inventors: Michel Cornet, Avon; Pierre Michel, Ormesson, both of France

[73] Assignees: Institut Technique des Cereales et des Fourrages, Paris; Association Generale des Producteurs de Mais, Pau; Ateliers Rolland S.A., Chateau du Loir, all of France

[21] Appl. No.: 836,137

[22] Filed: Mar. 4, 1986

[30] Foreign Application Priority Data

Mar. 6, 1985 [FR] France ................... 85 03312

[51] Int. Cl.⁴ ............................................. A01D 41/02
[52] U.S. Cl. ...................................... 56/16.5; 56/16.6; 56/126
[58] Field of Search ............... 56/12.9, 13.1, 16.4, 56/16.5, 16.6, 126, 501; 130/27 AE, 27 HF, 27 Z

[56] References Cited

U.S. PATENT DOCUMENTS

| 3,630,009 | 12/1971 | Ashton | 56/16.6 X |
| 4,178,743 | 12/1979 | Petsoons et al. | 56/12.9 |
| 4,441,511 | 4/1984 | Schroeder | 130/27 Z |
| 4,455,814 | 6/1984 | Kienholz | 56/126 |
| 4,466,230 | 8/1984 | Osselaeve et al. | 130/27 HF X |
| 4,515,276 | 5/1985 | Feller et al. | 130/27 Z X |

Primary Examiner—George A. Suchfield
Attorney, Agent, or Firm—Browdy and Neimark

[57] ABSTRACT

A self-driven chopper-harvester for experimental plots of ground of reduced size, intended especially for collecting fodder plants, comprises a collecting and chopping device forming a first module to which is connected via an ejection duct to a second module comprising an automatic weighing and sampling assembly.

8 Claims, 3 Drawing Figures

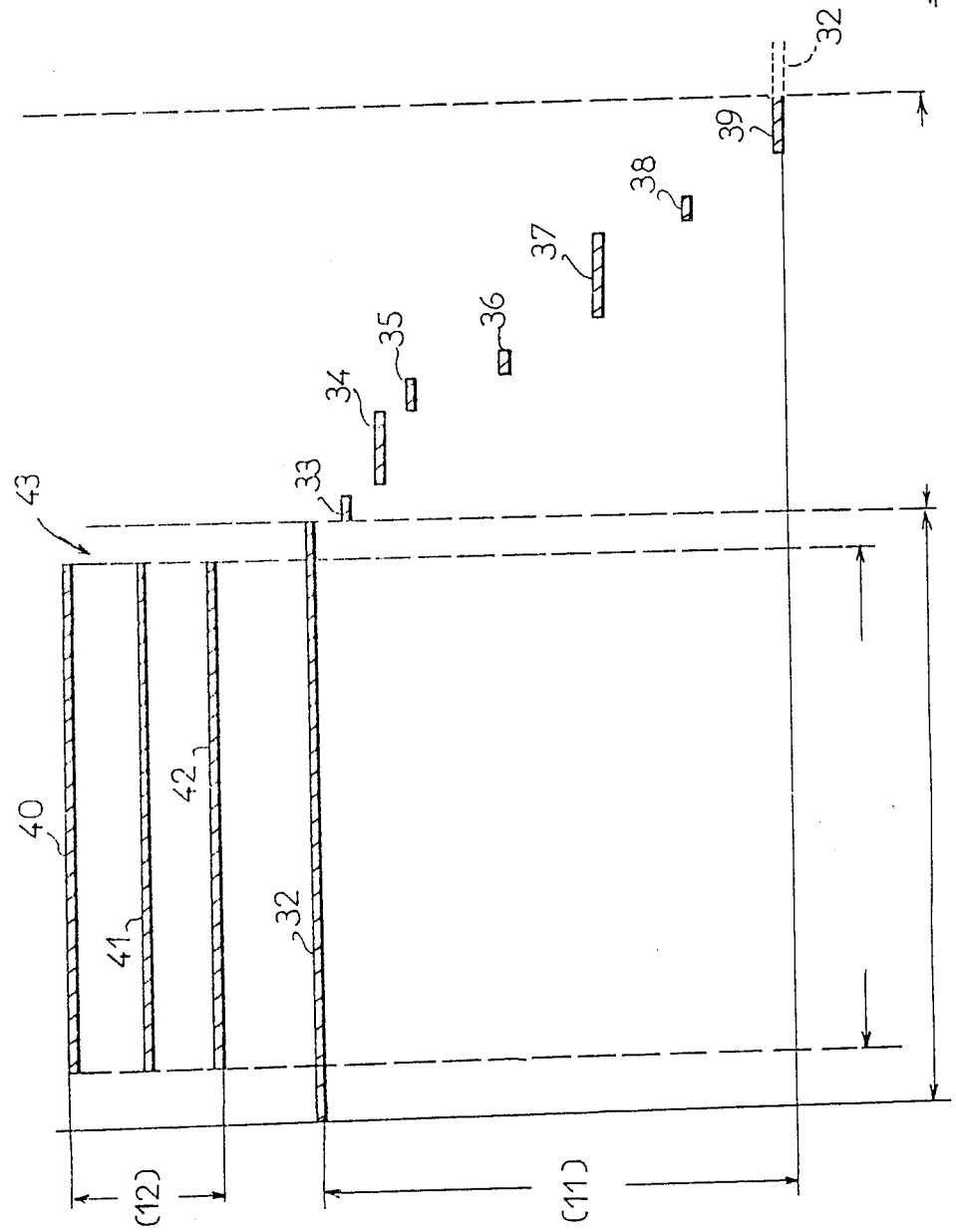

HARVESTER FOR EXPERIMENTAL PLOTS OF GROUND

BACKGROUND OF THE INVENTION

1. Field of the Invention

The present invention relates to a self driven chopper-harvester for experimental plots of ground of reduced size, intended more particularly for collecting fodder plants, said harvester comprising an automatic weighing and sampling assembly.

2. Description of the Prior Art

It is known that experimental seed beds to be harvested are generally disposed in successive strips or plots of five to twenty meters in length or more, each corresponding to a variety or to a different experimental treatment, for example using different treating products or products used at different doses.

Each plot is separated from the next by a path of 0.5 meters to 2.5 meters. Border rows, outside the test, should separate the adjacent plots from each other. Only the central part is then to be harvested.

Thus a central row out of three border rows sown at 0.8 meters spacing may be harvested for maize, or a strip of 1.5 meters in width may be harvested on plots of two to 2.5 meters cultivated with herbaceous varieties.

At the present time, harvesting experimental plots of small and average dimensions, namely 5 to 50 meters square and more is often carried out discontinuously in several successive phases: cutting - collecting - weighing - sampling - chopping, requiring a numerous staff and limiting the harvesting speed. Harvesting of experimental plots of small dimension cultivated with fodder maize is carried out at the present time almost exclusively by hand.

Moreover, the standard cultivation equipment does not allow experimental plots of small width to be harvested, that is to say less than 1.8 meters and of reduced size.

SUMMARY OF THE INVENTION

The present invention aims then at overcoming the above disadvantages by providing a specific self driven harvester, narrow and short, having the required means for automatic chopping, weighing and sampling allowing the operations to be carried out economically, automatically and reliably.

In accordance with the invention, the harvester, mounted on a self driven vehicle having a collecting and chopping means forming a first module, comprises a second module intended for weighing and sampling connected to the first module by means of an ejection duct and an opening stand-by hopper whose output is disposed in line with the conveyor associated with a weighing means and having a means for equalizing the load which it transports, the output of said conveyor opening onto a sampler assembly itself comprising a sample conditioning station and an outlet for discharging the collected product.

Advantageously, a first control station is connected to the device for advancing the vehicle as well as to the opening hopper and to the weighing means, whereas a second control station is connected to the conveyor, to the equalizer and the sampler.

BRIEF DESCRIPTION OF THE DRAWINGS

Other features and advantages of the invention will be better understood from the following description with reference to the accompanying drawings in which:

FIG. 3 is a table showing the phases of an operating cycle of the harvester.

In these drawings, the same references designate the same elements.

DESCRIPTION OF THE PREFERRED EMBODIMENT

Figure 1:
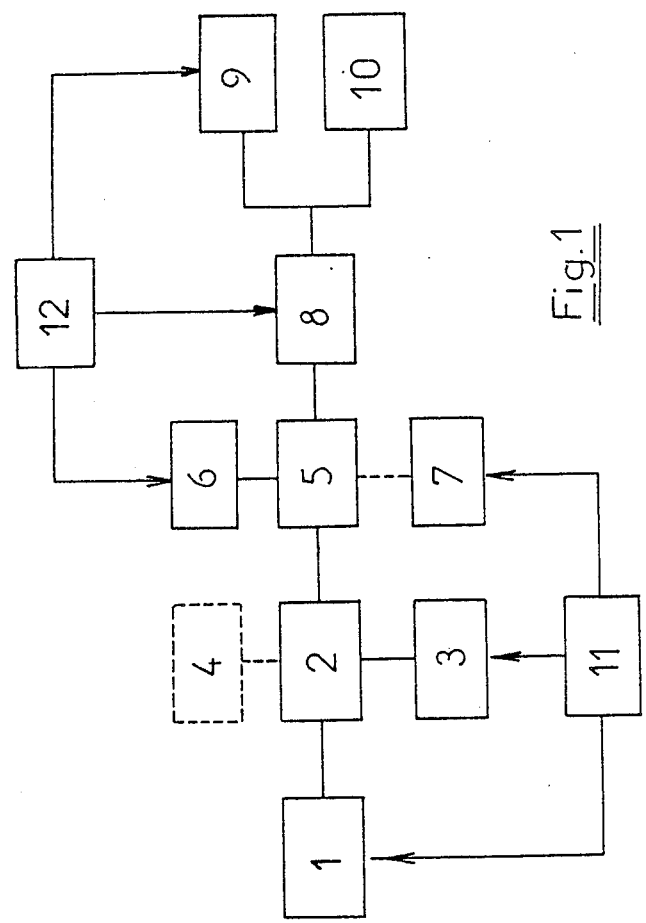
FIG. 1 is a block diagram of the different devices forming the harvester of the invention, with their control stations.

Referring to FIG. 1, the harvester of the invention, mounted on a self-driven vehicle (not shown) comprises advantageously two separable modules, one formed by the collecting and chopping means 1 known per se such as a collecting nose or an apron with a cutting bar, the other formed by the weighing and sampling means. The outlet of the collecting and chopping means 1 is connected to an opening stand-by hopper 2 having opening means 3 and possibly a weighing means 4 and whose contents is collected on a conveyor 5 having a means 6 for equalizing the load which it transports and advantageously associated with the weighing means 7. The load transported by the conveyor 5 and equalized is fed to a sampler 8 leading to a sample conditioning station 9 as well as to a discharge outlet 10. A first control station 11 available to the driver of the vehicle is connected to the collecting-chopping means 1, to the means 3 for opening the hopper and to the weighing means 7. A second control station 12 available to an operator is connected to the conveyor 5 and to its equalizer 6, to the sampler 8 and to the conditioning station 9 as well as to the discharge outlet 10.

Figure 2:
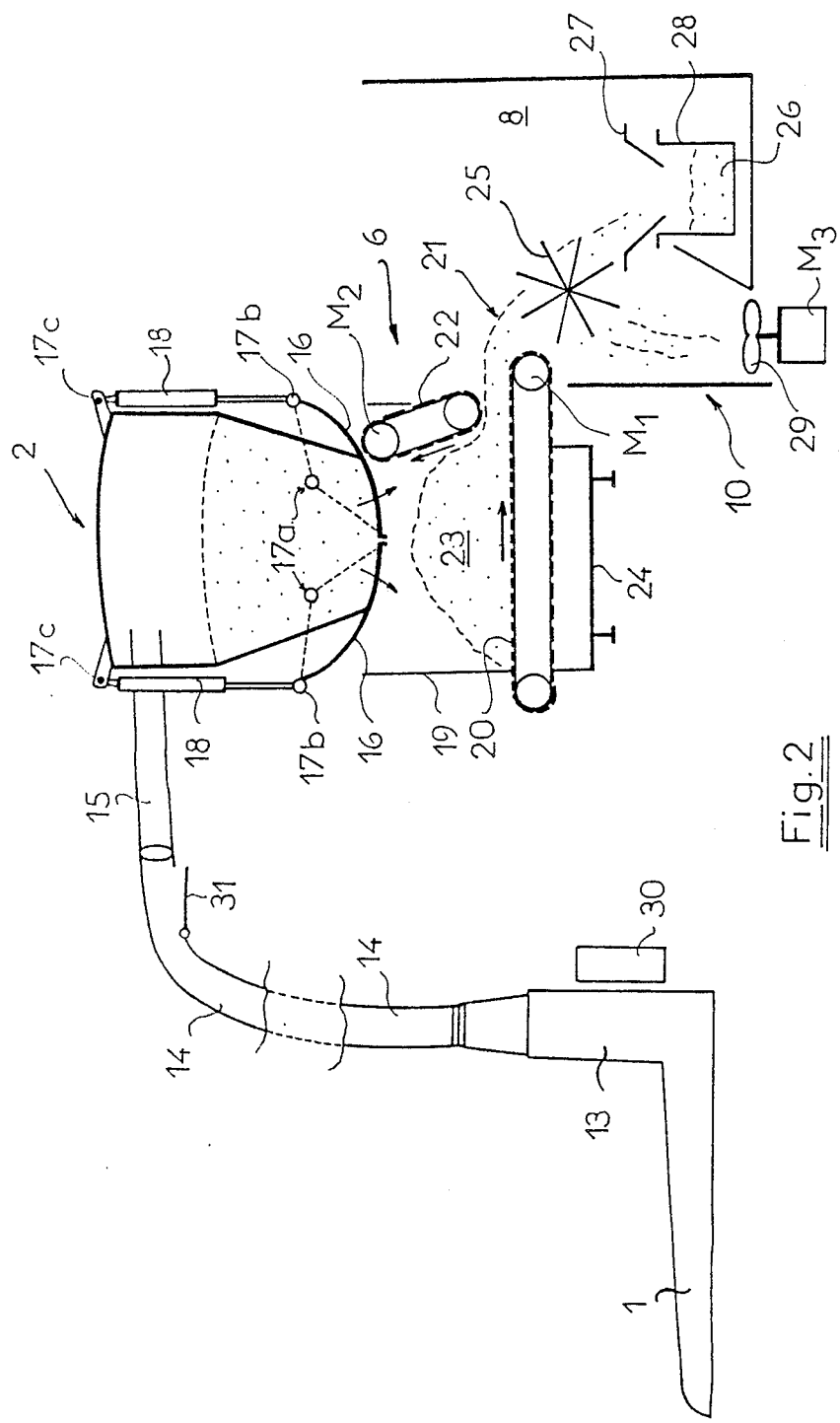
FIG. 2 is a schematical view of the harvester.

Referring to FIG. 2, the collecting-chopping means is for example in the form of a gathering nose 1 for one or for two rows of any appropriate type and the gathered product is fed by feed rollers (not shown) into a chopper-discharger 13 connected to a duct 14 where the chopped product is transported pneumatically, extended by a flexible or articulated and telescopic pipe 15 as far as the stand-by hopper 2. This hopper may be formed by a separator cyclone and it has two opening traps 16 at its upper part which are articulated by a set of suitable links 17a for pivoting about a pivot 17b connected to control cylinder 18 articulated at 17c. A sampling hopper 19 disposed in line with traps 16 comprises at its lower part an appropriate conveyor 20 in the form of a continuous belt or scraper, above and in the vicinity of the outlet 21 of which is disposed an appropriate equalizer 6 formed for example by a bar conveyor 22 intended to push the product 23 contained in hopper 19 on the side opposite the outlet 21 back in the direction of traps 16, so that the thickness of the transported product is constant in the direction of the sampling assembly shown by the general reference 8. Conveyor 20 is associated, in a way known per se, with a weighing means 24 of any appropriate type, for example a weighing platform with digital display.

Sampler 8 may be formed from a casing of given width representing a fraction of the width of conveyor 20, for example 1/10 or 1/20 depending on the type of sampling chosen. A blade wheel 25 of given width, disposed below the outlet 21, is intended to divert the product sample 26 by means of a conical guide 27 into an appropriate conditioning container 28 such as a bag or box. Depending on the product, the blade wheel 25 may have an appropriate shape and may be used without a casing for sampling. The discharge outlet generally referenced 10 for the collected product may be provided with a rotary disperser 29 or with any appropriate device for recovery of the product, such as a transporter belt or elevator-conveyor (not shown) opening into a suitable container or vehicle.

Of course, the different parts of the machine are driven by means of motors of any appropriate type and in particular hydraulic motors M1, M2, M3 respectively for conveyor 20, equalizer 22 and disperser 29, fed by a suitable pump 30. Moreover, and as will be better explained hereafter, the different parts comprise adjustment means within reach of the driver or the operator.

The operating cycle of the harvester is illustrated in the table shown in FIG. 3.

The two work stations operate simultaneously:
(a) cycle of the driving station (11, FIG. 1) (case of weighing on sampling hopper)
  harvesting with storage in the stand-by hopper:
  disengagement at the end of the plot (33),
  fixed point from 5 to 10 seconds for emptying the harvesting circuit: 34,
  motor idling,
  weighing comprising three phases:
    taring of the weighing hopper (0.0): 35
    opening of the traps of the stand by hopper: 36
    weighing and data acquisition: 37
  closure of the traps: 38
  engagement and new harvesting cycle (39).
(b) cycle of the sampling station (12, FIG. 1) immediately after the beginning of harvesting:
  starting up of the conveyor (14), of the equalizer (41) and of the sampler (42),
  stopping of the conveyor-equalizer and sampler assembly when the hopper 19 of the sampler is empty (43),
  conditioning and labelling of the sample.

Independently of the adjustments made in the workshop, the operators may make the following adjustments:
  adjustments of the gathering nose 1 such as recommended by the constructor;
    on the discharge duct 14 of the chopper plate is placed a trap 31 for adjusting the air flow and so the speed of the air in the cyclone depending on the humidity content of the product,
    on the drive motors, the speed of rotation is adjustable, thus controlling:
  (1) the advancing speed of the conveyor, as a function of the time for harvesting the plot, of the volume of the harvested product and of the thickness of the layer to be sampled,
  (2) the linear or peripheral speed of the equalizer 22, depending on the type of product,
  (3) the rotational speed of the rotor 25 of the sampler,
  (4) the rotational speed of the disperser 29 (ejection force) or the translational speed of a conveyor device for discharging the product after sampling; the following are also adjustable:
    the height of the equalizer 22 with respect to conveyor 20, thus controlling the thickness of the layer of product to be sampled,
    the width of sampling as well as positioning of the sampler with respect to the axis of the conveyor.

It is particularly advantageous for the harvesting-weighing assembly to comprise a certain number of servocontrol devices for increasing the reliability of the operations and preventing in particular any false experimental maneouvre, namely:
(1) avoiding the mixture of products between two successive plots, by:
  prevention of opening of the trap 16 controlling the hopper of the cyclone if the belt 20 of the sampling hopper is in operation, neutralization of the hdyraulic control of the hydraulic cylinders 18,
  prevention of harvesting (advance of the harvester) if the traps 16 are open or badly closed: sound signal controlled by the clutch pedal or any other means,
(2) preventing the absence of weighing, in particular by premature emptying of the sampling hopper 19 by :
  preventing starting up of the motors of the conveyor belt 20 and of the equalizer 22 if the traps 16 are open,
  and reciprocally preventing traps 16 from opening if the conveyor belt 20 is in operation,
(3) avoiding if necessary accumulation of the product under the machine (jamming of the discharge outlet) when the harvester is stopped during a cycle (harvesting hitch): motors M1 and M2 are controlled for advancing at the level of the clutch or by any other means.

An emergency stop device is available to the rear operator. This device stops the motors M1–M2 and M3, neutralizes the actuating cylinders 18 of the traps and sets off a sound signal intended for the driver or any other means neutralizing the advance of the harvester. A sound signal of a different tone further allows the driver and the rear operator to communicate with each other.

It will be readily understood that the present invention has been described and shown solely by way of explanation which is in no wise limitative and that any useful modification may be made thereto, particularly within the field of technical equivalences, without departing from the scope and spirit of the invention.

What is claimed is:
1. A harvester for collecting a product from experimental plots of ground comprising
  first and second modules mounted on a self driven vehicle;
  said first module including
    a collecting-chopping means including a gathering nose,
    an injection duct connected to said collecting-chopping means,
    and an opening stand-by hopper connected to an opposite end of said injection duct from said collecting-chopping means;
  said second module including
    means for weighing and means for sampling the collected product,
    a conveyor associated with said weighing means disposed in line with an opening in said stand-by hopper,
    means for equalizing the load of the collected product transported by said conveyor associated with said weighing means,
    said equalizing means and said conveyor associated with said weighing means forming an outlet to said sampling means,
    said sampling means including a sample conditioning station and said sampling means also having an outlet in said sampling means and a means for discharging the collected product collected from each plot in said outlet of said sampling means;

a first control station connected to a means to advance said vehicle and to a means to open said opening in said stand-by hopper;

a second control station connected to said conveyor associated with said weighing means, to said equalizing means, and to said sampling means;

said weighing means connected to one of said control stations.

2. The harvester as claimed in claim 1 wherein
said stand-by hooper is a separator cyclone with said opening in said hopper being an opening trap in its lower part;

said first control station including control actuating cylinders connected to said opening trap.

3. The harvester as claimed in claim 1 wherein
said weighing means includes
a weighing platform associated with a belt of said conveyor associated with said weighing means.

4. The harvester as claimed in claim 1 wherein
said equalizing means pushes the collected product on said conveyor associated with said weighing means in the direction of said opening in said hopper to maintain a constant thickness of the collected product in the direction of said sampling means.

5. The harvester as claimed in claim 1 wherein
said sampling means includes
a casing of a given width representing a fraction of the width of said conveyor, a bladed wheel in the path of the collected product from said conveyor, a conditioning container located to receive collected product diverted by said bladed wheel from said coveyor, and said outlet in said sampling means being an outlet from said casing for discharging the collected product from said casing.

6. The harvester as claimed in claim 1 wherein
said sampling means includes
a bladed wheel shaped to divert the collected product for sampling, disposed below said outlet to said sampling means.

7. The harvester as claimed in claim 1 wherein
said means for discharging the collected product from said sampling means includes a disperser.

8. The harvester as claimed in claim 1 wherein
said conveyor, said equalizing means, and said discharging means each include a motor means connected to a said control station and connected in a dependent manner to an advancing control of the vehicle.

* * * * *